March 22, 1960 R. KAISER 2,929,606
STOPCOCK WITH SPHERICAL PLUG
Filed July 18, 1958

Inventor:
Rudolf Kaiser,
By Ernest A. Marmorek,
His Attorney.

United States Patent Office 2,929,606
Patented Mar. 22, 1960

2,929,606

STOPCOCK WITH SPHERICAL PLUG

Rüdolf Kaiser, Ettlingen, Baden, Germany

Application July 18, 1958, Serial No. 749,442

Claims priority, application Germany June 14, 1958

6 Claims. (Cl. 251—174)

The invention relates to a stopcock with a spherical plug or more specifically a rotatable plug with part-spherical surfaces, which is guided with clearance in the cock housing on two journals arranged perpendicularly to the passage bore, and the sealing of which is effected by one or two annular pistons subject to the pressure of the flowing medium. In accordance with such stopcocks of the prior art, the plug consists of a material other than that of the cock housing. The latter is produced for example from cast steel and the former from aluminium or bronze. It has, however, been experienced that in the course of time so-called contact corrosion occurs, forming easily under the influence of the liquid medium flowing through the stopcock. This corrosion can even lead to complete interference with the operation of the stopcocks, so that they become useless.

The invention has for its principal object to provide a stopcock of the above-stated nature, with which this disadvantage is completely avoided, that is to say wherein no corrosion phenomena can occur.

The solution of this problem in accordance with the invention includes that the spherical plug is suspended in the cock housing in completely insulated manner.

Figure 1:
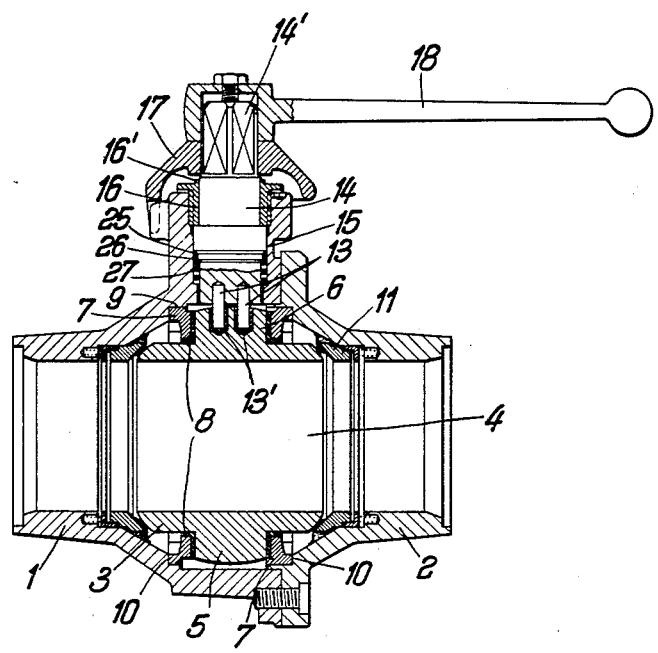
Figure 2:
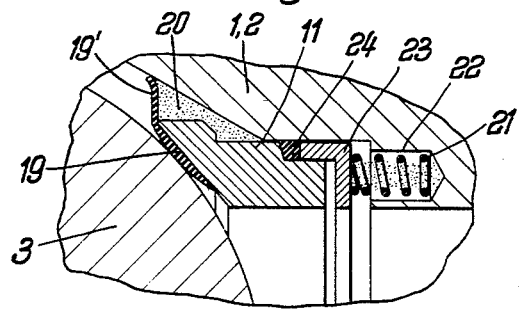

An example of embodiment is illustrated in the accompanying drawings in which:

Figure 1 shows an axial longitudinal section through a stopcock constructed in accordance with the invention, with the plug in open position, while Figure 2 illustrates a part of Figure 1, on an enlarged scale, disclosing the sealing off of the spherical plug in relation to the cock housing, but with the plug shown in closed position.

In the screwed-together parts 1 and 2 of a cock housing that has two opposite conduit structures, the spherical plug 3 is mounted in freely floating fashion, and is provided with a passage bore or conduit 4; when the conduit 4 is aligned with the conduit structures of the housing 1, 2 (Fig. 1), the stopcock is open, and when the plug 3 is turned (Fig. 2) the plug 3 closes the conduit structures thereby closing the stopcock. The spherical plug 3 is provided at the bottom with a boss or journal 5 and at the top with a boss or journal 6. These journals are completely symmetrical, and so narrow that their outer contours lie within the external diameter of the spherical plug 3. Due to this constructional design an easier and cheaper production of the spherical plug is rendered possible. The journals 5 and 6 are each mounted in a bearing bushings or sleeves and composed of an insulating synthetic plastic or rubber. The insulating bushings 8 are held by annular members or support bridges 7 serving as abutments, which are each mounted with their external face of cylindrical sector form in a bore 9 of the cock housing 1, 2. The support bridges are supported laterally on the plane faces 10 disposed perpendicularly of this bore 9; the bores 9 and faces 10 form bearing seats for the bridges 7. The bridges 7 can move in the peripheral direction and thus centre themselves in the housing bore 9.

Coaxially with the passage bore 4 there are provided sealing means which include annular pistons 11 which rest on the spherical surface of the cock plug 3. A stopcock construction is also possible wherein, in contrast to the example of embodiment as illustrated in Figure 1, only one annular piston is used instead of two annular pistons.

The upper journal 6 of the spherical plug 3 is coupled with an operating means such as a shaft 14 by means of four drive studs 13, of which only two are visible in Figure 1. These studs engage in shells 13' produced from insulating material, which are secured in the journal 6. Thus no metallic contact takes place between the operating shaft 14 and the spherical plug 3. The shaft 14 is guided in the bore 15 of the housing part 1 only in its upper, relatively short part, so that within this bore it can rock through a certain small angle. At its upper end the operating shaft 14 has a square head 14' carrying the hand lever 18.

In order to prevent penetration by water of condensation or rain water into the guide bore 15 of the operating shaft 14, a synthetic plastic bushing 16, composed for example of polyamide, is used, the end face of which is equipped with a sealing lip 16'. The cover cap 17, which is also held by the upper square head 14' of the operating shaft 14, serves as protection against water intrusion and at the same time limits the angle of movement of the hand lever 18. In the annular space between the lower part of smaller diameter of the operating shaft 14 and the housing bore 15 there are arranged a packing ring 25, a thrust ring 26 and compression springs 27.

Figure 2 shows that a rubber layer 19 is vulcanized on the guide face of each annular piston 11 facing the spherical plug 3. Each piston 11 is oppositely movable towards and from a normal position adjacent the plug 3 in which position its inner end serves as a valve seat to which a rubber layer 19 is vulcanized. Each rubber layer 19 has an extension 19' that serves as a lip seal and extends so far that the annular space defined by the housing part 1 or 2 on the one hand and the outer periphery of the annular piston 11 on the other is closed off in the direction towards the journals 5 and 6 of the spherical plug. This annular space is filled with a cushion 20 of grease. Due to the aforesaid lip seal by the extensions 19' there is prevented the penetration of the interior of the housing by corrosive media.

The sealing between the stockcock housing parts 1 and 2 and the annular pistons 11 is accomplished by means of an O-ring 24 in each case. This is mounted in a recess of the annular piston 11 closed off on the side remote from the spherical plug 3 by a thrust ring 23. Compression springs 21, held in bores 22 of the cock housing parts 1 and 2, bear on the latter. These bores are expediently also filled with grease.

It may be seen from the above description of an example of embodiment that the spherical plug 3 is suspended in completely insulated fashion in the cock housing, and therefore no contact corrosion can take place. In this manner the life of the stockcock itself is increased, even if a liquid flows through the stockcock which would otherwise greatly favour the corrosion of the metal parts. The pressurized medium flowing through the aligned conduit 4 and conduit structures of the housing 1, 2 (Fig. 1) will flow into the space between the pistons 11 and the thrust rings 23 and exert pressure against the pistons directed towards the plug 3, thereby aiding the springs 21 to press the pistons against the plug 3 to seal the conduit 4 to the conduit structures.

I claim:

1. In a stopcock, in combination, a housing including two opposite aligned conduit structures for conducting a fluid medium, a plug revolubly journalled in said housing and having a conduit and being turnable between an open position wherein its conduit is in alignment with the conduit structures and, respectively, a closed position at an angle thereto, said housing having two opposite bearing seats, means insulating said plug from said housing comprising two opposite bearing sleeves composed of insulating material and journalling said plug, each sleeve being held with relation by a seat, operating means connected to said plug though electrically insulated therefrom and guided in said housing and operable to turn said plug, and sealing means disposed in at least one conduit structure of said housing and comprising an annular piston movable to and from a normal position wherein its inner face is positioned adjacent said plug and biased towards said normal position, and insulating gasket means connected to the inner piston face and making non-conductive contact in said normal piston position with the exterior of said plug.

2. In a stopcock, in combination, a housing including two opposite aligned conduit structures for conducting a fluid medium, a plug revolubly journalled in said housing and having a conduit and being turnable between an open position wherein its conduit is in alignment with the conduit structures and, respectively, a closed position at an angle thereto, said housing having two opposite bearing seats, means insulating said plug from said housing comprising two opposite bearing sleeves composed of insulating material and journalling said plug, each sleeve being held with relation by a seat, operating means connected to said plug though electrically insulated therefrom and guided in said housing and operable to turn said plug, and sealing means disposed in each conduit structure of said housing and comprising two pistons, each reciprocally movable in a conduit structure to and from a normal position wherein its inner face is positioned adjacent said plug and biased towards said normal position, and insulating gasket means connected to the inner piston face and making non-conductive contact in said normal piston position with the exterior of said plug.

3. In a stopcock, as claimed in claim 2, said insulating means comprising means operable for positioning said bearing sleeves including an annular member disposed in each seat of said housing rotatably fitting therein and holding rotatably a sleeve.

4. In a stopcock, as claimed in claim 2, said operating means comprising insulating shells positioned in said plug, studs mounted within said shells, a shaft connected to said studs and revolubly guided in said housing, and a handle connected to said shaft.

5. In a stopcock, as claimed in claim 2, together with, spring means biasing said pistons toward the normal position, said gasket means comprising a layer of rubber vulcanized to said inner face of each piston, each piston having an unobstructed rear surface adapted to be subjected to fluid pressure of the fluid medium flowing through said conduit structures, whereby the plug is sealed by said pistons and rubber layers to the conduit structures in the normal position of said pistons by the combined force of the spring and fluid pressures.

6. In a stopcock, as claimed in claim 2, together with a thrust ring in driving connection with each piston in the direction towards said plug, and compression springs providing spring pressure against the thrust ring therein urging said pistons into the normal position, the outer periphery of each annular piston and the inner wall of the housing defining an annular space, said gasket including a sheet of rubber vulcanized to the inner face of said piston and having an extension serving as a lip seal for said annular space when said piston is in said normal position.

References Cited in the file of this patent

UNITED STATES PATENTS

| | | |
|---|---|---|
| 2,698,731 | Koehler | Jan. 4, 1955 |
| 2,832,563 | Walsh | Apr. 29, 1958 |
| 2,840,109 | Wadleigh | June 24, 1958 |

FOREIGN PATENTS

| | | |
|---|---|---|
| 1,094,708 | France | Dec. 8, 1954 |